Sept. 18, 1951     H. A. HAMM     2,568,623
ABSORBENT GLASS CONTAINER
Filed Aug. 10, 1946     2 Sheets–Sheet 1
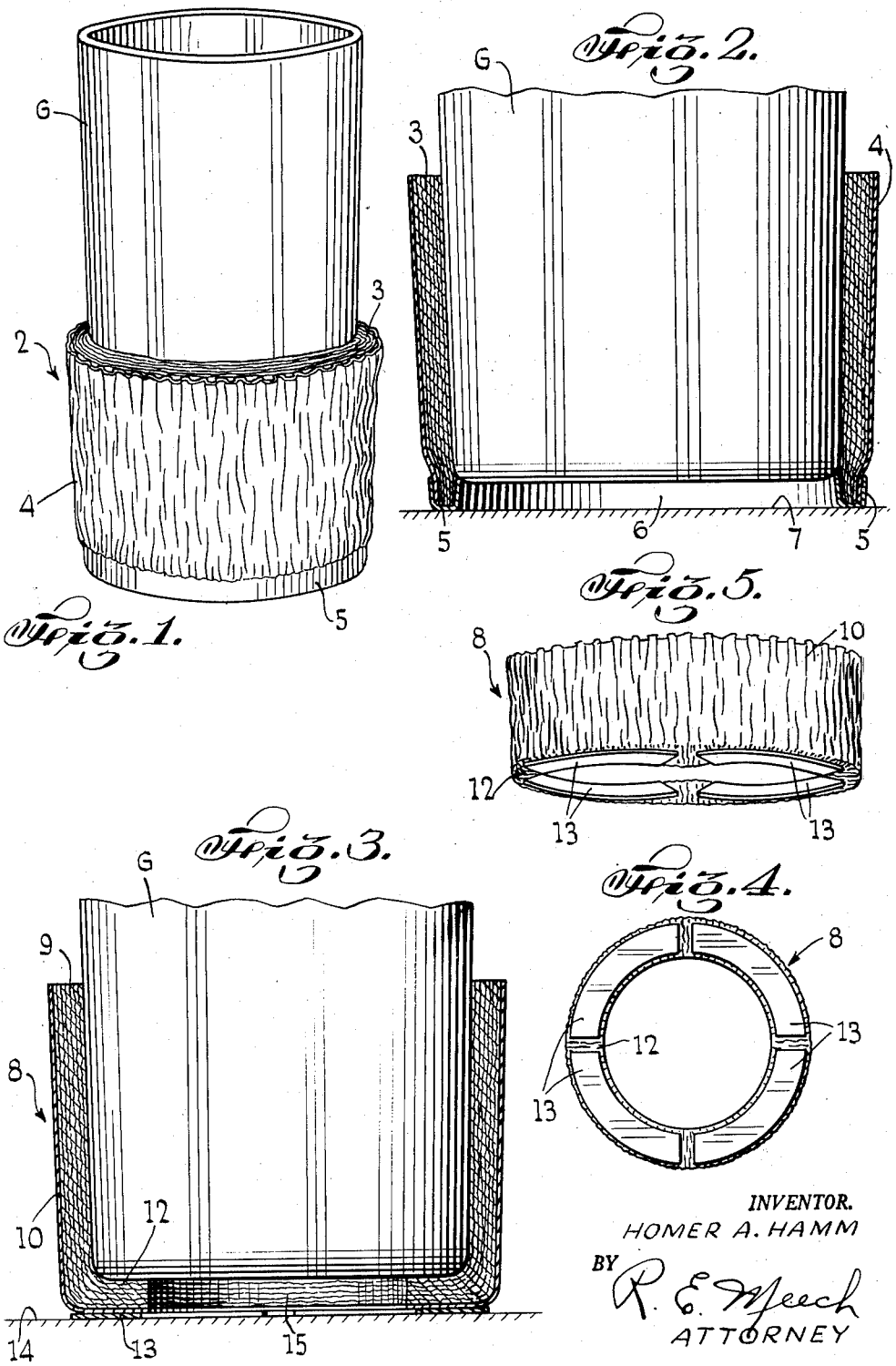
INVENTOR.
HOMER A. HAMM
BY R. E. Meech
ATTORNEY Sept. 18, 1951  H. A. HAMM  2,568,623
ABSORBENT GLASS CONTAINER
Filed Aug. 10, 1946  2 Sheets-Sheet 2
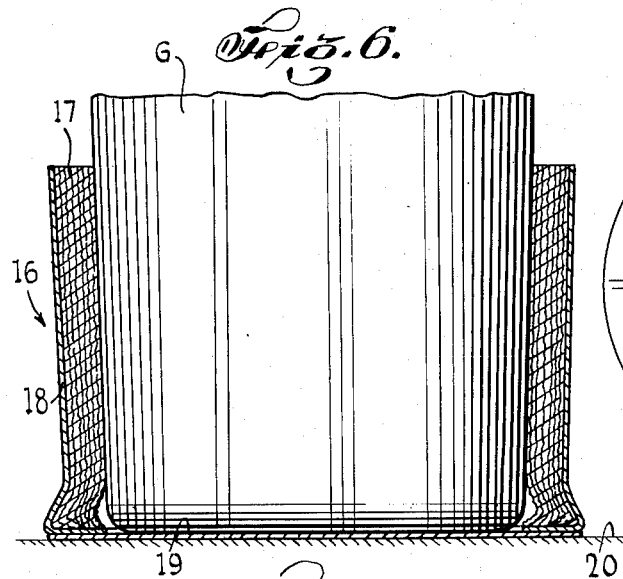
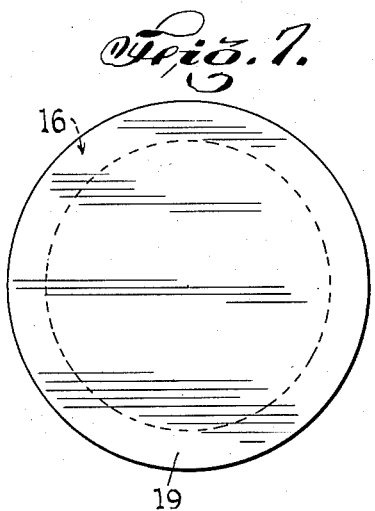
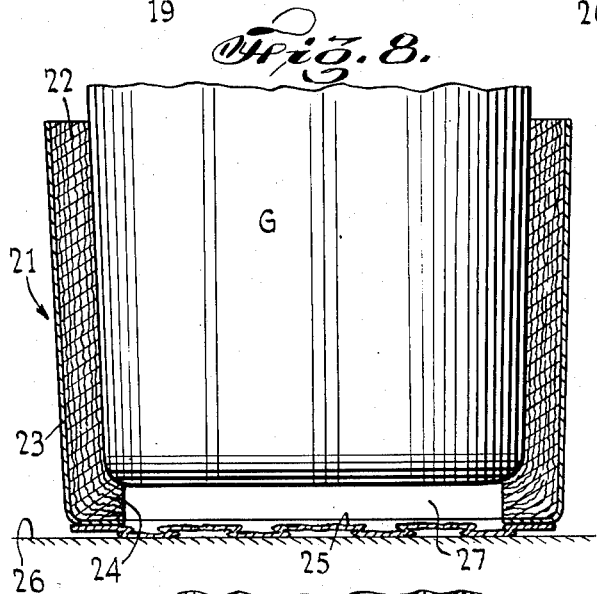
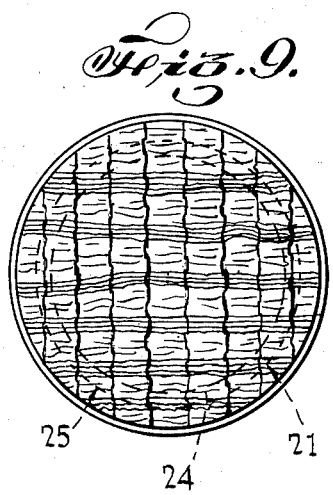
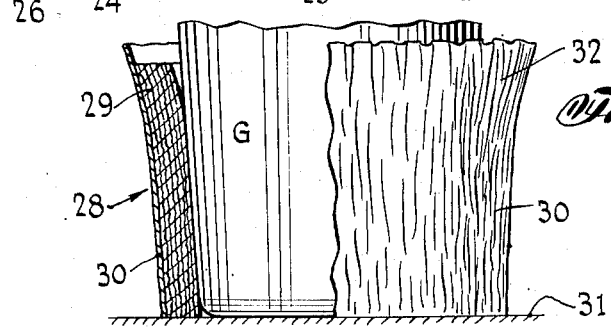
INVENTOR.
HOMER A. HAMM
BY R. E. Meech
ATTORNEY Patented Sept. 18, 1951

2,568,623

UNITED STATES PATENT OFFICE 2,568,623

ABSORBENT GLASS CONTAINER

Homer A. Hamm, Chicago, Ill.

Application August 10, 1946, Serial No. 689,680

3 Claims. (Cl. 65—61)

This invention relates to an improvement in absorbent holders or containers for drinking glasses and the like.

It is well known that when a drinking glass or any other liquid receptacle contains a liquid, especially iced or cold liquids, moisture collects on the outer surface of the glass due to condensation which eventually flows to the bottom and forms a pool on the particular surface on which the glass is setting, or drips from the bottom of the glass when being used. Also, oftentimes, a ring is formed on the supporting surface, especially if such surface is of polished wood, such as a table top, after the glass sets thereon for a relatively short period of time primarily due to difference in temperature between the glass and the supporting surface. Such a ring is difficult to remove and oftentimes necessitates refinishing of the supporting surface or table top.

While various absorbent containers or coasters, usually made of paper, have been heretofore suggested and used, they have not been entirely satisfactory. Usually, the absorbing qualities of such containers were not sufficient to absorb all of the moisture that collected on the glass and the containers, consequently, would become wet and soggy and defeat the purpose for which they were intended. Also, while such containers absorbed the moisture around the outer surface of the glass, they had no means to prevent a ring being formed thereby on the supporting surface. These containers also were oftentimes relatively expensive to manufacture and difficult to apply to the glass.

In the present invention, there is provided an absorbent container or holder which has the requisite absorbent qualities to collect and retain all of the moisture formed around the glass, and, in addition, there is provided an enclosed space at the bottom of the container between the bottom of the glass and the supporting surface so as to provide a dead air space therebetween, thereby eliminating any danger of a ring being formed on the supporting surface.

Accordingly, it is the general object of the present invention to provide an improved absorbent container for drinking glasses and the like which collects and retains the moisture formed around the outer surface of a glass and, at the same time, protects the supporting surface upon which the glass rests.

It is another object of the invention to provide an improved absorbent container which is resilient and easily and quickly applied to the glass merely by slipping it over the end thereof and, due to its resiliency, fits snugly around glasses of various diameters.

It is a further object of this invention to provide an improved absorbent container which is simple and inexpensive in its manufacture, and one which can be discarded at a minimum cost after it has been used.

It is still another object of the invention to provide an improved container which is highly decorative and lends itself to many different color effects, and one which can be formed in a flat or collapsed condition for packaging, shipping and storing so as to consume a minimum amount of space.

Various other objects and advantages of this invention will be more apparent in the course of the following specification, and will be particularly pointed out in the appended claims.

In the accompanying drawings, there is shown for the purpose of illustration, several modifications which my invention may assume in practice.

In these drawings:

Fig. 1 is a perspective view of one embodiment of the absorbent holder of the present invention, showing the position it assumes around an ordinary drinking glass when in use;

Fig. 2 is a vertical sectional view through the holder, as shown in Fig. 1, the glass being in elevation;

Fig. 3 is a vertical sectional view through another embodiment of the holder of my invention, showing it in position around the base of a glass which is in elevation;

Fig. 4 is a perspective view of the bottom portion of the holder shown in Fig. 3;

Fig. 5 is a view of the bottom of the holder shown in Figs. 3 and 4.

Fig. 6 is a vertical sectional view through still another embodiment of the holder of my invention in position around a glass which is in elevation;

Fig. 7 is a bottom view of the holder shown in Fig. 6;

Fig. 8 is a vertical sectional view through another embodiment of the holder of the present invention showing it in position around a glass in elevation;

Fig. 9 is a bottom view of the holder shown in Fig. 8; and

Fig. 10 is an elevational view partly in section of still another modified form of the holder of my invention around a glass.

Referring more particularly to the drawings, the embodiment shown in Figs. 1 and 2, consists of a relatively thick annular laminated body member 2, the inner portion 3 of which is made of a plurality of layers of absorbent material, preferably laminations of a cellulose creped material known in the trade as creped wadding or "Kimpak." Such material is highly stretchable or yieldable and has relatively high absorbent qualities and usually consists of eight to ten layers or laminations.

There is arranged around the outer side of this inner absorbent portion 3 preferably a thickness of paper 4, preferably crepe paper, which is stretchable and to a certain extent resilient. This outer layer of paper may be waterproofed, if desired, so as to ensure that this outer cover will not become saturated. Crepe paper being in different colors lends itself extremely well as an outer cover for the holder and makes the holder highly decorative. The crepe paper not only is highly decorative, but possesses certain inherent functional characteristics, namely, that it tends to hold the absorbent inner portion 3 in contact with the outer surface of the glass G at all times.

The bottom edge of the holder is preferably stiffened by means of a piece of relatively stiff and unstretchable paper 5 folded around the lower edges of both the inner absorbent portion 3 and the outer layer of paper 4 and preferably glued or otherwise adhesively secured to these lower edges, as shown in Fig. 2, so as to provide a skirt around the bottom edge of the holder. It is the purpose of the lower stiffened edge portion or skirt to support the glass a spaced distance from the bottom of the holder so as to provide a dead air space 6 between the bottom of the glass and the supporting surface 7, as shown in Fig. 2. This stiffened edge will support the glass for the reason that it is not stretchable and has a diameter slightly smaller than that of the bottom of the glass. This stiffened portion prevents the bottom of the glass from resting upon the supporting surface and, together with the dead air space 6, eliminates any danger of disfiguring or leaving a ring on the supporting surface, and this is one of the most important aspects of the present invention. The laminated, absorbent inner portion 3, of course, absorbs any moisture which collects on the outer surface of the glass due to condensation.

The annular inner portion 3, together with the outer paper cover 4, is formed preferably by cutting the "Kimpak" or laminated material and the crepe paper in relatively wide strips, forming a ring with ends disposed in overlapping relation, then gluing, cementing or otherwise securing the overlapped ends together to form the annular body member 2.

In the embodiment shown in Figs. 3 through 5 of the drawings, the annular body member 8 is formed in the same manner as that shown in Figs. 1 and 2, with an inner portion 9 consisting of a plurality of layers of absorbent material and an outer cover 10 preferably of crepe paper. In this construction, however, the lower edge portions of both the inner portion 9 and the outer cover 10 are turned inwardly so as to provide an inwardly extending annular flange portion 12 around the bottom of the body member. There is attached to this flange portion 12, as more clearly shown in Figs. 4 and 5, a plurality of spaced-apart segment-like members 13, four in the present instance, which are preferably made of relatively stiff material, such as a lightweight cardboard and secured preferably by gluing to the bottom side of the flange portion. It is the purpose of these segment-like members to stiffen this flange portion.

It will be seen, as shown in Fig. 3, that the bottom of the glass G rests upon the flange portion formed by the material of the inner absorbent portion 9, and that the segment-like members 13 rest directly upon the supporting surface 14 so as to space the bottom of the glass from the supporting surface. Likewise, in this construction it will be seen that there is provided a dead air space 15 between the bottom of the glass and the supporting surface.

The modification shown in Figs. 6 and 7 of the drawings, consists of an annular body member 16, the same as that previously described, namely, an inner portion 17 made of a plurality of layers of an absorbent material, such as "Kimpak," and an outer layer of crepe paper 18. In this construction, there is provided a bottom for the holder consisting of a circular piece of relatively stiff material 19, such as lightweight cardboard, which is preferably glued or otherwise adhesively secured to the bottom edges of the inner portion 17 and the outer cover 18 so as to provide a cup-like body member. It will be seen in this construction, however, that the glass G rests directly upon the relatively stiff bottom 19 which protects the supporting surface 20 from the bottom of the glass.

In Figs. 8 and 9, there is shown another modification which is similar to that shown in Figs. 6 and 7. In this construction, there is likewise provided an annular body member 21, having an inner portion 22 made of a plurality of layers of absorbent material, preferably "Kimpak," with an outer cover of crepe paper 23. The lower edges of both the inner portion 22 and the outer cover 23 are turned inwardly so as to provide an inwardly extending annular flange portion 24 therearound. There is attached to the lower side of this flange portion, preferably by glue or some other suitable adhesive, a circular member 25 which is made from a relatively soft material, preferably two-way stretch crepe paper, so as to provide a cup-like body member. It will be seen from Fig. 8 that the glass G rests upon the flange portion 24 so as to be spaced from the bottom 25, as well as from the supporting surface 26 upon which the bottom 25 rests. This provides a dead air space 27 between the bottom 25 and the supporting surface 26.

In the modification shown in Fig. 10, there is provided, as before, an annular body member 28 having an inner portion 29 consisting of a plurality of layers of absorbent material, preferably "Kimpak," with an outer layer of crepe paper 30 disposed therearound. It will be seen that the bottom edge of the body member 28 is flush with the bottom of the glass G when positioned therearound, and rests directly on the supporting surface 31. The upper portion of the body member may be flared outwardly, as at 32, if desired, to facilitate placing of the holder on the glass and to provide a more decorative effect. This, of course, is true of any of the constructions shown.

It will be understood that in any of the several modifications shown that the holder is positioned on the glass merely by slipping it over the bottom thereof and is held thereon primarily due to the resiliency of the crepe paper outer cover or jacket. This resilient characteristic of crepe paper also permits the holder to be used with glasses of various diameters.

By providing a holder of such construction, it will be seen that it is collapsible thereby lending itself for ease in packaging for shipping. It is ready for use when taken from the package, and maintains its shape when in use due to its adherence to the outer side of the glass which it fits snugly at all times. After it has been used it can be dried for further use, but preferably is so inexpensive that it can be discarded.

While I have shown and described in this application, several embodiments which my invention may assume in practice, it will be understood that these embodiments are merely for the purpose of illustration and that other forms may be devised within the scope of my invention as set forth in the appended claims.

What I claim as my invention is:

1. A protective sleeve for a glass comprising an annular body member made from laminations of a resilient and highly absorbent creped wadding material surrounded by a layer of crepe paper, said body member constructed and arranged so as to contact and fit tightly the side walls of the glass when positioned therearound, and a combined stiffening and supporting means arranged along the bottom edge of said body member to which the bottom edges of said laminations and outer layer of crepe paper are adhesively secured which acts to bind together said laminations and said outer layer of crepe paper and stiffens the body member at said bottom edge, said means extending along at least the outer surfaces of the laminations so as to strengthen and stiffen the same at said bottom edge and to act as a support for the glass when said sleeve is disposed therearound so as to space the bottom of the glass from the supporting surface.

2. A protective sleeve for a glass, as defined in claim 1, wherein the stiffening and supporting means arranged along the bottom edge of the body member extends upwardly from said bottom edge along the inner as well as along the outer surfaces of the laminations so as to strengthen and stiffen said laminations at said bottom edge.

3. A protective sleeve for a glass, as defined in claim 1, wherein the means arranged along the bottom edge of the body member which acts to bind together the laminations and outer layer of crepe paper consists of a piece of relatively stiff and unstretchable paper folded about and over said bottom edge and adhesively secured to said laminations and crepe paper.

HOMER A. HAMM.

REFERENCES CITED

The following references are of record in the file of this patent:

UNITED STATES PATENTS

| Number | Name | Date |
|---|---|---|
| 715,828 | Markmann | Dec. 16, 1902 |
| 1,349,099 | Redpath | Aug. 10, 1920 |
| 1,370,024 | Kempton | Mar. 1, 1921 |
| 1,632,347 | Pipkin | June 14, 1927 |
| 1,771,765 | Benson | July 29, 1930 |
| 1,891,077 | Beach | Dec. 13, 1932 |
| 1,917,953 | Davis | July 11, 1933 |
| 1,924,926 | Gray | Aug. 29, 1933 |
| 2,014,268 | Tenney | Sept. 10, 1935 |
| 2,122,628 | Tracy | July 5, 1938 |
| 2,285,341 | Lyon | June 2, 1942 |
| 2,335,968 | Sawtell | Dec. 7, 1943 |

FOREIGN PATENTS

| Number | Country | Date |
|---|---|---|
| 471,298 | France | July 7, 1914 |
| 589,945 | France | Mar. 6, 1925 |